United States Patent [19]

Blum et al.

[11] Patent Number: 4,985,506

[45] Date of Patent: Jan. 15, 1991

[54] OXIDATIVELY CROSS-LINKABLE, WATER DILUTABLE BINDERS, A PROCESS FOR THEIR PREPARATION AND THEIR USE

[75] Inventors: Harald Blum, Wachtendonk; Peter Höhlein, Kempen; Michael Sonntag, Odenthal; Wolfgang Wellner, Bergisch Gladbach, all of Fed. Rep. of Germany

[73] Assignee: Bayer Aktiengesellschaft, Leverkusen, Fed. Rep. of Germany

[21] Appl. No.: 371,262

[22] Filed: Jun. 26, 1989

[30] Foreign Application Priority Data

Jul. 7, 1988 [DE] Fed. Rep. of Germany ....... 3822995

[51] Int. Cl.$^5$ .................................................. C08F 8/42
[52] U.S. Cl. .................................... 525/298; 525/303; 525/327.7; 525/327.8; 525/367; 525/368; 525/369; 525/371; 525/372
[58] Field of Search ................... 525/327.7, 327.8, 298, 525/303

[56] References Cited

U.S. PATENT DOCUMENTS

| | | | |
|---|---|---|---|
| 3,301,829 | 1/1967 | Woodward et al. | 525/327.7 |
| 3,784,528 | 1/1974 | Pirck et al. | 260/78.5 |
| 4,013,609 | 3/1977 | Hultzsch et al. | 525/327.7 |
| 4,670,504 | 6/1987 | Cardenas et al. | 525/327.7 |

FOREIGN PATENT DOCUMENTS

| | | |
|---|---|---|
| 3514878 | 11/1986 | Fed. Rep. of Germany . |
| 2155983 | 5/1973 | France . |

Primary Examiner—Bernard Lipman
Attorney, Agent, or Firm—Connolly and Hutz

[57] ABSTRACT

Oxidatively cross-linkable, water dilutable binders suitable for lacquers, coating compositions and sealing compounds are modified co-polymers of olefinically unsaturated compounds, having a molecular weight of 6000 to 160,000 and having for each 100 grams of solids content, a total of from 60 to 250 milliequivalents of chemically incorporated carboxyl groups, of which from 10 to 100% are neutralized thereby rendering the product dilutable in water and from 15 to 50% by weight of chemically incorporated moieties corresponding to the formula

—O—R wherein

R represents an olefinically monounsaturated or polyunsaturated aliphatic hydrocarbon having a molecular weight above 166 and containing from 12 to 22 carbon atoms, are prepared by:

(a) preparing a co-polymer having a molecular weight from 5000 to 80,000, determined by gel permeation chromatography, and having intramolecular carboxylic acid anhydride units corresponding to the formula

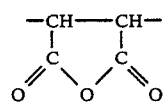

and an anhydride equivalent weight of from 240 to 1960 by a radically initiated co-polymerization of olefinically unsaturated dicarboxylic acid anhydrides with other olefinically unsaturated monomers, (b) reacting at least 50% of the acid anhydride units present in the co-polymer from (a) with an unsaturated monohydric alcohol corresponding to the formula

R—OH with anhydride ring opening ester formation, and (c) converting the free carboxyl groups in the reaction product of (b) to an extent of 10 to 100% into carboxylate groups by neutralization of the carboxys with a base.

5 Claims, No Drawings

OXIDATIVELY CROSS-LINKABLE, WATER DILUTABLE BINDERS, A PROCESS FOR THEIR PREPARATION AND THEIR USE

This invention relates to oxidatively cross-linkable, water dilutable binders containing chemically incorporated carboxylate groups and olefinically unsaturated hydrocarbon groups capable of oxidative drying, a process for the preparation of these binders and their use in lacquers and coating and sealing compounds.

BACKGROUND OF THE INVENTION

Oxidatively drying water soluble binders based on alkyd resins are known (see e.g. German Patent Specification No. 1 669141 and EP-A-No. 2 488 and the literature cited there). Coatings produced from these binders are normally distinguished by their good optical and mechanical properties as films. One disadvantage of these products, however, is their susceptibility to saponification in aqueous, neutralized solution due to the basic polyester structure. Under storage conditions, the products undergo phase separation and settle out. It would also be desirable to obtain shorter drying times in such alkyd resins.

One alternative to such binders are the polymer binders which dry by purely physical means and which are distinguished by very rapid drying and excellent storage stability (see e.g. DE-OS No. 3 209 421, EP-A-No. 95 263, G. Y. Talak, S. P. Pontis, Paint & Resin 12/83, pages 34 et seq). These products have, however, the disadvantage that the coatings are inferior in their film optical values and have little resistance to solvents due to the lack of chemical cross-linking.

In order to render these systems more resistant to external influences, polyacrylates which dry at room temperature have been modified with oxidatively cross-linkable components, e.g. by the reaction of glycidyl co-polymers with drying fatty acids (e.g. GB-PS Nos. 793 776 and 1 227 398) or by the esterification of OH functional co-polymers with drying fatty acids (e.g. DF-OS No. 2 728 568).

These binders have, however, failed to become established on account of their cost as well as some lacquer technical disadvantages such as slow drying and problems which arise when the lacquer is recoated due to a marked tendency of the recoated lacquer film to lift from the surface. Moreover, such binders are not suitable for use in water dilutable systems.

It was therefore an object of the present invention to provide a binder which would ensure rapid physical drying of coatings combined with good film optical values and which would in addition undergo oxidative cross-linking and be usable in aqueous systems and resistant to saponification and stable in storage and would in addition contain a very low proportion of organic solvent in its aqueous, neutralized form, preferably less than 10%.

BRIEF DESCRIPTION OF THE INVENTION

The problem was able to be solved by means of a radically initiated co-polymerisation of co-polymerisable anhydrides and other olefinically unsaturated monomers such as (meth)acrylic acid derivatives, aromatic vinyl compounds, vinyl esters or vinyl ethers under solvent free conditions or in an organic solution to produce co-polymers which are subsequently modified with monohydric alcohols capable of oxidative drying and optionally with low molecular weight monohydric alcohols, this modification being followed by at least partial neutralization of the carboxyl groups present. According to one particular variation, some of the carboxyl groups present after the modification may be reacted with compounds containing epoxide groups to vary the properties of the binders. The resulting binders can be diluted with water after partial or complete neutralization of the remaining carboxyl groups.

DETAILED DESCRIPTION

The present invention relates to oxidatively cross-linkable, water dilutable binders consisting substantially of a modified co-polymer in the molecular weight range of from Mw 6000 to Mw 160,000 of olefinically unsaturated compounds, characterised by (a) chemically incorporated carboxyl groups in a total quantity of from 60 to 250 milliequivalents per 100 g of solids, which carboxyl groups are neutralized to an extent of 10 to 100% and render the compound dilutable in water, and (b) chemically incorporated groups of the formula

present to an extent of 15 to 50% by weight, wherein R stands for olefinically mono-unsaturated and/or poly-unsaturated aliphatic hydrocarbon groups having a molecular weight above 166 and containing 12 to 22 carbon atoms.

The invention also relates to a process for the preparation of these binders, characterised in that (a) a co-polymer in the molecular weight range of from Mw 5000 to Mw 80,000 having an anhydride equivalent weight of from 240 to 1960 and containing intramolecular carboxylic acid anhydride groups corresponding to the formula

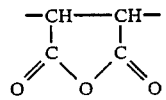

is prepared by radically initiated co-polymerisation of olefinically unsaturated dicarboxylic acid anhydrides with other olefinically unsaturated monomers, (b) at least 50% of the acid anhydride groups present in the co-polymer are subsequently reacted with monohydric alcohols of the formula

with ring opening ester formation, an analogous reaction of up to 50% of the anhydride groups with monohydric saturated alcohols having a molecular weight below 184 being optionally also carried out before, simultaneously with or after the aforesaid reaction, and (c) from 10 to 100% of the carboxyl groups present in the reaction product of stage (b) are converted into carboxylate groups by neutralization with a base, optionally after reaction of a proportion of the carboxyl groups with organic epoxide compounds, the "10 to 100%" referring to the number of carboxyl groups present after the reaction with epoxide compounds.

The invention also relates to the use of these binders in water dilutable lacquers and coating compounds.

The co-polymers prepared in stage (a) of the process according to the invention have a molecular weight Mw determined by gel permeation chromatography of from 5000 to 80,000. preferably from 10,000 to 50,000, and an anhydride equivalent weight of from 240 to 1960, preferably from 320 to 980. The "anhydride equivalent weight" is taken to be the weight in g which corresponds to 1 mol of intramolecular acid anhydride groups incorporated by polymerisation.

Preparation of the co-polymers in stage (a) is carried out by radically initiated co-polymerisation of olefinically unsaturated intramolecular dicarboxylic acid anhydrides with any other olefinically unsaturated monomers.

This co-polymerisation is preferably carried out with a monomer mixture consisting of (i) from 5 to 40 parts by weight of co-polymerisable dicarboxylic acid anhydrides such as itaconic acid anhydride or maleic acid anhydride, preferably maleic acid anhydride, (ii) from 45 to 95 parts by weight of monomers selected from aromatic vinyl compounds, aromatic isopropenyl compounds, vinyl esters, vinyl ethers, methacrylic acid esters having 1 to 6 carbon atoms in the alcohol moiety and any mixtures of such monomers, and (iii) from 0 to 50 parts by weight of monomers selected from acrylic acid esters containing 1 to 18 carbon atoms in the alcohol moiety, methacrylic acid esters containing 7 to 18 carbon atoms in the alcohol moiety and any mixtures of such monomers.

The following are examples of suitable monomers from group (ii): styrene, α-methylstyrene, vinyl toluene styrenes substituted with $C_1$ to $C_4$ alkyl groups on the aromatic ring, vinyl acetate, vinyl propionate, vinyl butyrate, ethylvinyl ether, butylvinyl ether, methyl methacrylate, ethyl methacrylate, n-butyl methacrylate, isobutyl methacrylate, n-hexyl methacrylate and cyclohexyl methacrylate.

The following are examples of suitable monomers from group (iii): ethyl acrylate, n-butyl acrylate, isobutyl acrylate, n-propyl acrylate, n-pentyl acrylate, isopropyl acrylate, hexyl acrylate, 2-ethylhexyl acrylate, n-octyl acrylate, lauryl acrylate, 2-phenylethyl acrylate, benzyl acrylate, stearyl acrylate, cyclohexyl acrylate, n-octyl methacrylate, 2-ethylhexyl methacrylate, lauryl methacrylate, caprin methacrylate and stearyl methacrylate.

In stage (a) of the process according to the invention, monomer mixtures of the following composition, in which the percentages given below add up to 100, are preferably used for the preparation of the co-polymers:

(i) from 10 to 30% by weight of maleic acid anhydride,
(ii) from 65 to 90% by weight of styrene, vinyl toluene, methyl methacrylate, n-butyl methacrylate, isobutyl methacrylate, n-hexyl methacrylate, cyclohexyl methacrylate and
(iii) from 0 to 25% by weight of n-butyl acrylate, 2-ethylhexyl acrylate, lauryl acrylate, stearyl acrylate, 2-phenylethyl acrylate, 2-ethylhexyl methacrylate, stearyl methacrylate, lauryl methacrylate, caprin methacrylate.

Preparation of the co-polymers is carried out by a radically initiated co-polymerisation of the monomer mixtures in organic solution or without solvents. The organic solvent is preferably put into the process in such a quantity that a lacquer prepared from the co-polymer contains $\leq 10\%$ of solvent or alternatively part of the solvent put into the process may subsequently be distilled from the resin melt so that the finished lacquer has the low solvent content mentioned above.

Suitable solvents are, for example, dimethyldiglycol, dimethyl propylene glycol, N-methyl pyrrolidone, methylisobutyl ketone and acetone. A certain amount of water immiscible solvents may also be added, e.g. butyl acetate, methoxy propyl acetate, solvent naphtha, white spirits, xylene or toluene.

The initiators used may be organic peroxides such as dibenzoyl peroxide, di-tert.-butyl peroxide, tert.-butylperoxy-2-ethyl hexanoate (tert.-butyl peroctoate), didecanoyl peroxide and azo compounds such as azodiisobutyric acid nitrile in quantities from 0.5 to 10% by weight.

Molecular weight regulators such as n-dodecyl mercaptan may also be added in quantities of from 0.01 to 5% by weight for obtaining the desired molecular weight.

The co-polymerisation is generally carried out at a temperature from 60° to 160° C.

It is preferably carried out in an at least 75% solution which is normally prepared by introducing the solvent and optionally part of the monomer mixture into the reaction vessel and heating it to the required reaction temperature. The remaining monomer mixture and the initiator are then added continuously over a period of 3 to 6 hours. At least part of the solvent may be distilled off after polymerisation has been completed.

According to the preferred variation of the process according to the invention, the co-polymers prepared as described above, which contain intramolecular anhydride groups, are reacted in stage (b) with monohydric alcohols which are capable of oxidative drying, at least 50%, preferably at least 85% of the anhydride groups being converted in the process into semiesters with ring opening esterification and up to 50%, preferably up to 15% of the anhydride groups being optionally converted into semiesters by a reaction with low molecular weight, saturated monohydric alcohols before, during and/or after this modification reaction.

The monohydric alcohols capable of oxidative drying are olefinically monounsaturated or polyunsaturated monohydric alcohols having a molecular weight above 183 and corresponding to the following formula

R-OH wherein

R has the meaning already indicated above and preferably stands for an olefinically monounsaturated or polyunsaturated aliphatic hydrocarbon group containing 14 to 18 carbon atoms.

Examples of suitable alcohols of this type include lauroleic alcohol, oleyl alcohol, linoleic alcohol, linolenic alcohol, elaidic alcohol, gadoleic alcohol, arachidonic alcohol, erucic alcohol, elupanodonic alcohol and mixtures of these alcohols.

Preferred alcohols are the fatty alcohol mixtures obtained from natural oils such as soya bean oil or linseed oil by transesterification and hydrogenation, e.g. Ocenol 110/130 or Ocenol 150/170 (trade product of Henkel).

The semiester formation is normally carried out after preparation of the co-polymers, by adding the alcohol or alcohol mixture to the co-polymer which may previously have been partly or completely freed from any solvents present, and then maintaining the reaction mixture at 100° to 160° C. for 2 to 10 hours or until the total acid number is constant.

The above mentioned unsaturated alcohols are used in such quantities in stage (b) of the process according to the invention that at least 50%, preferably at least 85% of the acid anhydride groups present in the co-polymers of stage (a) are converted into semiester groups with ring opening ester formation, i.e. the molar ratio of anhydride groups to hydroxyl groups of the unsaturated alcohols in stage (b) of the process is generally from 1:0.5 to 1:1, preferably from 1:0.85 to 1:1. After stage (b) of the process according to the invention has been carried out, the modified co-polymers obtained generally contain from 15 to 50% by weight, preferably from 20 to 40% by weight, of chemically incorporated structural units of the formula

-O-R

To ensure that the oxidatively drying binders obtained will be dilutable with water, the carboxyl groups present are at least partly converted into carboxylate groups by neutralization with a suitable base.

The bases used for neutralization may be aqueous, inorganic bases such as sodium hydroxide, potassium hydroxide or ammonia but organic amines are also suitable, e.g. trimethylamine, triethylamine, diethanolamine, methyl diethanolamine, dimethylethanolamine, diethylethanolamine, triethanolamine and 2-amino-2-methyl-1-propanol, as well as mixtures of these and other neutralizing agents.

Neutralization may be carried out, for example, by the following methods:

A mixture of water and neutralizing agent is heated to 40°-80° C. and the hot resin melt or solution is stirred in. The neutralizing agent, optionally diluted with water, may also be added directly to the resin solution and the neutralized resin solution may then be adjusted to the required solids content by the addition of water.

The neutralization reaction converts up to 100%, preferably from 20 to 80% of the carboxyl groups present into carboxylate groups by neutralization.

According to another particular embodiment of the process according to the invention, up to 50%, preferably up to 15% of the acid anhydride groups present in the co-polymers from stage (a) are reacted with monohydric, saturated alcohols having a molecular weight below 184 to bring about ring opening ester formation, as already indicated above. This reaction is carried out in a manner entirely analogous to the above mentioned reaction with the unsaturated monohydric alcohols and may take place before, during or after the modification with unsaturated alcohols.

This reaction is preferably carried out after the modification according to stage (b) by converting at least 95%, preferably 100% of the acid anhydride groups still present after the modification with unsaturated alcohols into semiester groups by a reaction entailing ring opening ester formation. The low molecular weight monohydric alcohol may be used in excess to ensure as complete reaction as possible. In such a case, the equivalent ratio of hydroxyl groups in the monohydric alcohols (alcohols capable of oxidative drying + monohydric saturated alcohols having a molecular weight below 184) to the anhydride groups may be, for example, from 1:1 to 1.25:1.

The following are examples of suitable monohydric, saturated alcohols having a molecular weight below 184: methanol ethanol, propanol, n-butanol, n-pentanol, n-hexanol, cyclohexanol. methyl glycol, ethyl glycol, butyl glycol, methoxy propanol, ethoxy propanol, butoxy propanol, methyl diglycol, ethyl diglycol, butyl diglycol, methyl glycolate, ethyl glycolate, methyl lactate or mixtures of such alcohols.

In this variation of the process according to the invention, the nature and quantitative proportions of the reactants put into the process should also be so chosen that the resulting modified copolymers contain from 15 to 50% by weight, preferably from 20 to 40% by weight of structural units corresponding to the formula

-O-R.

Lastly, in this variation of the process according to the invention, the carboxyl groups present are again at least partly converted into carboxylate groups by neutralization, preferably to an extent of from 20 to 80%.

According to another variation of the process according to the invention, which may also be combined with the last mentioned variation of the additional modification with monohydric alcohols having molecular weights below 184, the carboxyl groups present after the modification reaction with the monohydric alcohols are partly converted into ester groups by a reaction with organic compounds containing epoxide groups. As for the quantity of compounds with epoxide groups used for this purpose, it is only necessary to ensure that sufficient carboxyl groups are left in the unreacted form so that the binder will be dilutable with water after conversion of these carboxyl groups into carboxylate groups by neutralization. In this variation of the process according to the invention, up to 70%, preferably up to 50% of the carboxyl groups present after the modifying reaction with the monohydric alcohols are generally reacted with compounds containing epoxide groups.

The following are examples of suitable organic compounds containing epoxide groups: monoepoxides such as ethylene oxide, propylene oxide, 1,2-epoxybutane, 1,2-epoxy-2-methyl propane, 2,3-epoxybutane, styrene oxide, 1,2-epoxy-3-phenoxy propane, 1-allyloxy-2,3-epoxy propane, cyclohexene oxide, methyl glycidyl ether, tert.-butyl glycidyl ether, glycidyl methacrylate, glycidyl esters of versatic acid (e.g. ®Cardura E 10, Shell Chemie), decyl glycidyl ethers or mixtures of these and other epoxides.

Conventional catalysts such as tetrabutyl ammonium bromide, triethylbenzyl ammonium chloride or tetraethyl ammonium chloride may be added to accelerate the reaction between carboxyl groups and epoxide.

The reaction is generally carried out at 80° to 150° C. for 3 to 12 hours. The oxidatively drying co-polymers thus modified with epoxides may now be converted into water dilutable resins by at least partial neutralization of the remaining carboxyl groups, as already described above.

In all the variations of the process according to the invention, the nature and quantitative proportions of the starting materials and the degree of neutralization (=percentage of carboxyl groups converted into carboxylate groups by neutralization) are designed to ensure that the binders according to the invention contain from 15 to 50% by weight, preferably from 20 to 40% by weight, of structural units corresponding to the formula

-O-R and that the binders have a carboxyl group content of from 10 to 250 milliequivalents, preferably from 80 to 190 milliequivalents, per 100 g of solids, from 10 to 100%, preferably from 20 to 80% of which carboxyl groups are neutralized by a reaction with a base, i.e. converted into carboxylate groups. The figures given above concerning the carboxyl group content thus relate both to the free carboxyl groups which are not neutralized and to the neutralized carboxyl groups, i.e. the carboxylate groups.

When aqueous neutralizing agents are used, the binders according to the invention are generally obtained directly in the form of aqueous dispersions. If desired, the preparation of aqueous dispersions may be carried out in a known manner after an anhydrous neutralization reaction.

Small quantities, about 0.01 to 2%, of surface active substances may be added to assist the dilutability or dispersibility in water.

The binders present in aqueous form, preferably as 20 to 50% by weight aqueous dispersions, may still contain small quantities of organic solvents (up to 20% by weight but preferably less than 10% by weight, based on the solids content). The aqueous dispersions may be used directly as lacquers for the formation of clear coatings without any further additives.

In general, however, pigments and conventional additives such as drying accelerators, antioxidants, antiskinning agents, antifoamants, wetting agents, fillers, etc. are added.

Preferred drying accelerators include the known siccatives, i.e. salts of (cyclo)aliphatic monocarboxylic acids containing 6 to 18 carbon atoms with metals such as cobalt, manganese, nickel, chromium, zinc, zirconium, aluminium, calcium, barium or lead. These may be incorporated in the resin melt or added when triturating the lacquer or incorporated subsequently in the finished lacquer.

Pigments, additives and the oxidatively drying co-polymer are triturated together in known manner to form the finished lacquers. The grinding apparatus used may be e.g. sand mills, bead mills, ball mills or three-roller mills.

The finished lacquers preferably contain less than 10% of volatile organic compounds and normally have solids contents of from 30 to 60%.

The oxidatively drying co-polymers may be used in or as aqueous, air drying coating compounds for plastics, metals, glass, wood, paper, cardboard and ceramics. Other possible applications include the use of the binders in printing inks for textile or leather and in impregnating or reinforcing agents for paper, textiles and leather.

The coating compounds may be applied by conventional techniques such as flooding, immersion, spraying, spread coating, casting and roller application.

The systems according to the invention are particularly suitable for use at room temperature although forced drying by heat at about 60° to 100° C. may be carried out for 5 to 30 minutes to reduce the drying time.

Data concerning parts and percentages by weight given in the following examples relate to the non-volatile solids unless explicitly stated otherwise.

EXAMPLE 1

486 g of dimethyl diglycol are introduced into a 4 liter three necked flask equipped with stirrer, condenser and heating device and heated to 130° C. A mixture of 500 g of maleic acid anhydride, 400 g of styrene, 900 g of methyl methacrylate and 200 g of n-butyl acrylate is added in 3 hours and at the same time 71 g of tert.-butyl peroctoate (70% in a hydrocarbon mixture) are added over a period of 4 hours. 5.6 g of tert.-butyl peroctoate are added after 1 hour's stirring and the mixture is again stirred for 2 hours. 1200 g of ®Ocenol 110/130 (unsaturated fatty alcohol, Henkel) are then added and the reaction mixture is maintained at 135° C. for 6 hours. After the 86.5% resin melt obtained has cooled to 80° C., 12 g of cobalt octoate and 85.4 g of lead octoate are added. 3700 g of this resin melt are dispersed in a water-/ammonia mixture which has been heated to 45° C. and the mixture is stirred at 60° C. for 6 hours. 48 g of antiskinning agent ®Ascinin R conc (Bayer AG) are then added to the aqueous resin dispersion and the dispersion is filtered through a KoOO filter.

The aqueous resin dispersion has a solids content of 43.5% and a pH of 6.2. The 100% resin contains 36% by weight of structural units of the formula -O-R and contains a total of 220 milliequivalents of free and neutralized carboxyl groups per 100 g of solids content, the degree of neutralization being 20%.

EXAMPLE 2

196 g of dimethyl diglycol are introduced into a 4 liter three necked flask equipped with stirrer, condenser and heating device and heated to 130° C. A mixture of 240 g of maleic acid anhydride, 160 g of styrene, 300 g of butyl acrylate and 1300 g of methyl methacrylate is introduced over a period of 3 hours and 114 g of tert.-butyl peroctoate (70% in a hydrocarbon mixture) are added over 4 hours. After 1 hour at 130° C., a further 5.6 g of tert.-butyl peroctoate is added and the reaction mixture is stirred for 1 hour. After the addition of 136 2 g of N-methyl pyrrolidone, 612 g of ®Ocenol 110/130 are added and the reaction mixture is stirred at 135° C. for 6 hours. After dilution with 108 g of butyl diglycol, cooling to 80° C. and the addition of 10.1 g of cobalt octoate and 27 g of ethoxylated nonylphenol (NP 20), an 85% resin melt is obtained which is stirred into a water/ammonia mixture which has been heated to 50° C. After 4 hours stirring at 60° C., 40 g of ®Ascinin R conc are added and the mixture is filtered through a KoOO filter.

The aqueous resin dispersion has a solids content of 36.5% and a pH of 6.9. The 100% resin contains 23% by weight of structural units of the formula -O-R and a total of 101 milliequivalents of free and neutralized carboxyl groups per 100 g of solids content, the degree of neutralization being 39.5%.

EXAMPLE 3

455 g of dimethyl diglycol are introduced into a 4 liter three necked flask equipped with stirrer, condenser and heating device and heated to 130° C. A mixture of 500 g of maleic acid anhydride, 400 g of styrene and 1100 g of methyl methacrylate is added in 3 hours and 114 g of tert.-butyl peroctoate (70% in a hydrocarbon mixture) are added in 4 hours. After 1 hour at 130° C., a further 5.6 g of tert.-butyl peroctoate is added and the reaction mixture is stirred for 2 hours. 1200 g of ®Ocenol 110/130 are added and stirring is continued for a further 6 hours at 135° C. After dilution with 134.8 g of N-methyl pyrrolidone, 27.5 g of ethanol are added and the reaction mixture is maintained at 120° C. for 1 hour. 195.5 g of butyl glycol are then added and stirring is continued for a further 2 hours at 120° C. The reaction mixture is then cooled to 90° C. and 163.9 g of butyl glycol, 655.6 g of glycidyl ester of versatic acid (®Cardura E 10, Shell Chemie) and 3.9 g of triethyl benzyl ammonium chloride are added in succession. The reaction mixture is then stirred at 90° C. until the total acid number is constant. 39.4 g of ethoxylated nonylphenol (NP 20) and 39.4 g of cobalt octoate in 30 g of butyl glycol are then added and homogeneously stirred in.

The resulting 80% resin melt is stirred into an aqueous solution of neutralizing agent (ammonia+2-amino-2-methyl-1-propanol (3:1)) which has been heated to 50° C. After 4 hours stirring at 60° C., 60 g of ®Ascinin R conc are added and the mixture is filtered through a KoOO filter.

The aqueous resin dispersion has a solids content of 38.0% and a pH of 7.1. The 100% resin contains 31% by weight of structural units of the formula -O-R and a total of 93 milliequivalents of free and neutralized carboxyl groups per 100 g of solids content, the degree of neutralization being 48%.

EXAMPLE 4

486 g of dimethyl diglycol are introduced into a 4 liter three necked flask equipped with stirrer, condenser and heating device and heated to 130° C. A mixture of 300 g of maleic acid anhydride, 100 g of styrene, 200 g of n-butyl acrylate and 1400 g of methyl methacrylate is added in 3 hours and at the same time 114 g of tert.-butyl peroctoate (70% in a hydrocarbon mixture) is added in 4 hours. After 1 hour at 130° C., 5.6 g of tert.-butyl peroctoate are added and the reaction mixture is stirred for 2 hours. 720 g of ®Ocenol 110/130 are then added and stirring is continued for a further 6 hours at 135° C. After the resin melt obtained has cooled to 70° C., 27.2 g of cobalt octoate and 72.5 g of lead octoate are incorporated. The resulting 80% resin melt is dispersed in an aqueous ammonia solution heated to 50° C. After 4 hours stirring at 60° C., 41 g of ®Ascinin R conc are added and the mixture is filtered through a KoOO filter. The resulting aqueous resin dispersion has a solids content of 37.6% and a pH of 6.0. The 100% resin contains 26% by weight of structural units of the formula -O-R and a total of 183 milliequivalents of free and neutralized carboxyl groups per 100 g of solids content, the degree of neutralization being 24%.

EXAMPLE 5

455 g of dimethyl diglycol are weighed into a 6 liter three necked flask equipped with stirrer, condenser and heating device and heated to 130° C. A mixture of 500 g of maleic acid anhydride, 400 g of styrene and 1100 g of methyl methacrylate is introduced in 3 hours and at the same time 114 g of tert.-butyl peroctoate (70% in a hydrocarbon mixture) is added in 4 hours. After 1 hour'stirring at 130° C., 5.6 g of tert.-butyl peroctoate are added and the mixture is stirred for 2 hours. 1200 g of ®Ocenol 110/130 are added and stirring is continued for 6 hours at 130° C. 134.8 8 of N-methyl pyrrolidone are then added, the reaction mixture is cooled to 120° C., 27.1 g of ethanol are added, the mixture is stirred for 1 hour, 281 g of butyl glycol, 341 g of ®Cardura E 10 and 3.6 g of triethylbenzyl ammonium chloride are added and the reaction mixture is maintained at 90° C. until the total acid number is constant. 36.3 g of ethoxylated nonylphenol (NP 20) and 36.3 g of cobalt octoate are then added and homogeneously incorporated.

The 80% resin melt obtained is dispersed in an aqueous ammonia solution which has been heated to 50° C. After 4 hours stirring at 60° C., 54 g of ®Ascinin R conc are added and the mixture is filtered through a KoOO filter. The aqueous resin dispersion obtained has a solids content of 35.2% and a pH of 6.5. The 100% resin contains 34% by weight of structural units of the formula -O-R and a total of 141 milliequivalents of free and neutralized carboxyl groups per 100 g of solids content, the degree of neutralization being 32%.

EXAMPLE 6

455 g of dimethyl diglycol are weighed into a 6 liter three necked flask equipped with stirrer, condenser and heating device and heated to 130° C. A mixture of 500 g of maleic acid anhydride, 400 g of styrene and 1100 g of methyl methacrylate is added in 3 hours and at the same time 114 g of tert.-butyl peroctoate (70% in a hydrocarbon mixture) are added. After 1 hour at 130° C., a further 5.6 g of tert.-butyl peroctoate is added and the reaction mixture is maintained at 130° C. for 2 hours. After the addition of 1200 g of ®Ocenol 110/130, stirring is continued for 6 hours at 135° C., the reaction mixture is diluted with 134.8 g of N-methyl pyrrolidone, 27.6 g of ethanol are added and the reaction mixture is stirred at 120° C. for 1 hour. After the addition of 195.5 g of butyl glycol, stirring is continued at 120° C. for 2 hours and the reaction mixture is then cooled to 90° C. 3.52 g of triethylbenzyl ammonium chloride and a mixture of 63.3 g of butyl glycol and 253 g of 1,2-epoxy butane are added. The reaction mixture is then stirred at 90° C. until the total acid number is constant and 35.2 g of ethoxylated nonylphenol (NP 20) and 35.2 g of cobalt octoate are then incorporated.

The 80% resin melt thus obtained is dispersed in an aqueous, ammoniacal solution and stirred at 60° C. for 4 hours. 52 g of ®Ascinin R conc are added and the mixture is filtered through a KoOO filter.

The aqueous resin dispersion obtained has a solids content of 38.8% and a pH of 7.2. The 100% resin contains 34% by weight of structural units of the formula -O-R and a total of 112 milliequivalents of free and neutralized carboxyl groups per 100 g of solids content, the degree of neutralization being 39%.

The aqueous resin dispersions obtained according to the examples are triturated with iron oxide pigments (®Bayferrox 160 M/180 M, Bayer AG; pigmentation level: 30% based on the resin solids content) and a dispersing auxiliary (®Dispex G 40, Krahn Chemie; 1% based on the pigments) in a bead mill to produce red lacquers which are adjusted to a spraying viscosity of 25 to 30 seconds, measured in a DIN 4 mm cup, by means of demineralised water. The lacquers are applied to degreased steel sheets The following values were obtained:

|  | Examples | | | | | |
|---|---|---|---|---|---|---|
|  | 1 | 2 | 3 | 4 | 5 | 6 |
| Solids content at spraying viscosity (%) | 46.8 | 41.4 | 42.4 | 40.1 | 39.6 | 44.1 |
| Organic solvent content in the lacquer (%) | 5 | 5 | 6 | 5 | 6 | 7 |
| Lacquer storage stability 4 weeks/40° C.[1] | (a) | (b) | (b) | (a) | (a) | (a) |
| Thickness of dried layer after application by spraying (μm) | 40 | 40 | 40 | 40 | 40 | 40 |
| Tack free drying at room temperature (hours) | 2.5 | 1.5 | 2.5 | 2.5 | 1.5 | 1.5 |
| Pendulum hardness according to Konig (sec) | | | | | | |
| after 1 days drying | 68 | 64 | 25 | 73 | 42 | 45 |
| after 7 days drying | 85 | 115 | 49 | 92 | 81 | 90 |
| Gardner gloss 20°/60° | 67/85 | 69/88 | 78/90 | 74/86 | 69/87 | 71/89 |
| Solubility by super petrol after 7 days drying (exposure time 1 minute)[2] | 1 | 2 | 1 | 0 | 1 | 1 |

[1] (a) = no result, (b) ground deposit which can be stirred up
[2] 0 = no result, 5 = completely dissolved The aqueous binders obtained according to the examples have a high quality of properties also when used as glazes on wood or in painters, or DIY lacquers.

Both glazes and lacquers show excellent stability in storage. The processing properties, especially the ability to be spread coated, are satisfactory. Quick drying, hard, glossy coatings were obtained which moreover showed little tendency to yellowing.

We claim:

1. Oxidatively cross-linkable, water dilutable binders which consist essentially of a modified co-polymer of olefinically unsaturated compounds, having a molecular weight range of from 6000 to 160,000 as determined by gel permeation chromatography, and having
   (a) for each 100 g of solids content, a total of from 60 to 250 milliequivalents of chemically incorporated carboxyl groups, of which from 10 to 100% have been neutralized thereby rendering the product dilutable in water and from 15 to 50% by weight of pendant ester moieties corresponding to the formula

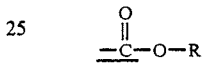

wherein R represents an olefinically monounsaturated or polyunsaturated aliphatic hydrocarbon having a molecular weight above 166 and containing from 12 to 22 carbon atoms.

2. Binders according to claim 1 wherein the modified co-polymer is a co-polymer of an unsaturated dicarboxylic acid anhydride wherein up to 50% of the copolymerized anhydride moieties have been reacted with unsaturated alcohol R-OH, wherein R is the same as specified in claim 1.

3. Binders according to claim 2 wherein the copolymer is copolymerized unsaturated dicarboxylic acid anhydride and another olefinically unsaturated monomer.

4. Binders according to claim 2 wherein the modified co-polymer has up to 50% of the copolymerized anhydride moieties at least partially esterified by reaction with a saturated aliphatic alcohol or glycol with a molecular weight of less than 184.

5. In an improved lacquer or coating composition containing a binder composition, the improvement comnprising said binder being the composition as claimed in claim 1.

* * * * *